United States Patent
Doty et al.

(10) Patent No.: US 8,522,260 B2
(45) Date of Patent: Aug. 27, 2013

(54) INTEGRATION OF RUNTIME ENVIRONMENTS

(75) Inventors: John David Doty, Seattle, WA (US);
Geoffrey M. Kizer, Seattle, WA (US);
Jeffrey C. Schlimmer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1130 days.

(21) Appl. No.: 12/211,737

(22) Filed: Sep. 16, 2008

(65) Prior Publication Data

US 2010/0070983 A1    Mar. 18, 2010

(51) Int. Cl.
*G06F 3/00*    (2006.01)

(52) U.S. Cl.
USPC .......................................... 719/319; 719/328

(58) Field of Classification Search
USPC .................. 719/319, 328, 329, 315
See application file for complete search history.

(56) References Cited

U.S. PATENT DOCUMENTS

| | | | |
|---|---|---|---|
| 7,496,887 B2 * | 2/2009 | Grasselt et al. ............... | 717/101 |
| 7,509,655 B2 * | 3/2009 | Willis et al. .................... | 719/320 |
| 7,770,152 B1 * | 8/2010 | Kamen et al. .................. | 717/127 |
| 7,949,991 B1 * | 5/2011 | Kuwamoto et al. ........... | 717/100 |
| 2002/0169842 A1 * | 11/2002 | Christensen et al. ......... | 709/206 |
| 2003/0105887 A1 * | 6/2003 | Cox et al. ....................... | 709/328 |
| 2004/0044987 A1 | 3/2004 | Kompalli et al. | |
| 2004/0045013 A1 * | 3/2004 | Lam ............................... | 719/328 |
| 2005/0050555 A1 * | 3/2005 | Exley et al. .................... | 719/328 |
| 2006/0200748 A1 | 9/2006 | Shenfield | |
| 2006/0259577 A1 | 11/2006 | Fritsch et al. | |
| 2007/0074121 A1 | 3/2007 | Mullender et al. | |
| 2007/0094207 A1 | 4/2007 | Yu et al. | |
| 2007/0261018 A1 | 11/2007 | Sanghvi et al. | |
| 2011/0209162 A1 * | 8/2011 | Machiraju et al. ............ | 719/328 |

OTHER PUBLICATIONS

Kambhampaty et al. "Architecture for Next Generation Business Applications", Proceedings fo the 10th WSEAS Int. Conference on Computers, Athens, Greece Jul. 13-15, 2006, pp. 584-589.*
Graham ".NET 3.0 End to End Example (WPF+WF+WCF+CardSpace=Jolly good fun" online web site blog, Jan. 4, 2007 "http://blogs.msdn.com/b/graham_elliott/archive/2007/01/05/net-3-0-end-to-end-example-wpf-wf-wcf-cardspace-jolly-good-fun.aspx".*
Three-way Integration: WPF, WF, and WCF (1 page) http://msdn2.microsoft.com/en-us/library/aa970891.aspx (2008).
Matt W's Windows Workflow Place (4 pages) http://blogs.msdn.com/mwinkle/archive/2007/06/07/introducing-the-pageflow-sample.aspx.

(Continued)

*Primary Examiner* — Emerson Puente
*Assistant Examiner* — Willy W Huaracha
(74) *Attorney, Agent, or Firm* — Workman Nydegger

(57) ABSTRACT

The integration of two runtimes. The integration may be accomplished via the sharing of all or a portion of the environments of each of the runtimes with each other. For instance, as one runtime executes a particular application, control may be passed at an appropriate point to the second runtime. The second runtime may pass control back to the first runtime at an appropriate time. This passing of control between runtimes may happen perhaps a number of times during the execution of the application. The applications might be expressed entirely declaratively in a manner that integrates both runtimes as the application executes. Thus, the application may take advantage of the strengths of each runtime at the appropriate time.

8 Claims, 3 Drawing Sheets

(56) References Cited

OTHER PUBLICATIONS

Data Binding in a Windows Presentation Foundation Client (3pages) http://msdn2.microsoft.com/en-us/library/ms752215.aspx (2007).

WCF Service Consuming XAML from a WPF Client (1 page) http://msdn2.microsoft.com/en-us/library/ms756491.aspx (2008).
Integration Samples for .NET Framework 3.0 Features (1 page) http://msdn2.microsoft.com/en-us/library/ms756478.aspx (2008).

* cited by examiner

INTEGRATION OF RUNTIME ENVIRONMENTS

BACKGROUND

Runtimes offer services to executing applications while those applications are running. Runtimes often specialize in the domain of applications that they serve. For instance, presentation runtimes tend to serve applications that are oriented toward presentation. WINDOWS® Presentation Foundation (WPF) is an example of a presentation layer that serves as a presentation runtime. Workflow runtimes, on the other hand, tend to serve applications that are reliant on sophisticated application control. WINDOWS® Workflow Foundation (WF) is an example of a workflow runtime.

The operation of WINDOWS Presentation Foundation (WPF) and WINDOWS Workflow Foundation (WF) are both driven by XAML documents, albeit each runtime uses a different schema of XAML in order to operate. As a side note, the XAML specification introduces several concepts, two of which are of particular note here. One concept is referred to as "markup extension", which is an object that derives from the System.Windows.Markup.MarkupExtension abstract class. In general, the XAML parser treats a markup extension as it would any other object. However, the XAML parser calls the markup extension's ProvideValue method to produce the final object, rather than simply inserting the markup extension object directly. The second concept is referred to as the "x:Name attribute", which uniquely identifies object elements for access to the instantiated object from code-behind or general code. Once applied to a backing programming model, x:Name can be considered equivalent to the variable holding an object reference, as returned by a constructor. While markup extensions and x:Name attributes are known, they have not been used together in a way that integrates WPF and WF, but are used for different purposes entirely.

The WPF runtime is strong in presentation, while the WF runtime is strong in underlying control. However, there is no conventionally known way to integrate these runtimes for applications that want the sophisticated presentation offerings of WPF while also providing the strong execution logic and control afforded by WF.

BRIEF SUMMARY

Embodiments described herein relate to the integration of two runtimes. In one embodiment, the integration is accomplished via the sharing of all or a portion of the environments of each of the runtimes with each other. As an example, as one runtime executes a particular application, control may be passed at an appropriate point to the second runtime. The second runtime may pass control back to the first runtime at an appropriate time. This passing of control between runtimes may happen perhaps a number of times during the execution of the application. In one embodiment, the application is expressed entirely declaratively in a manner that integrates both runtimes as the application executes. Thus, the application may take advantage of the strengths of each runtime at the appropriate time.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

Embodiments described herein relate to the integration of two runtimes. In one embodiment, the integration is accomplished via the sharing of all or a portion of the environments of each of the runtimes with each other. As an example, as one runtime executes a particular application, control may be passed between the runtimes at appropriate times. Thus, the application may take advantage of the strengths of each runtime at the appropriate time. First, a general computing system will be described with respect to FIG. 1. Then, various embodiments of the runtime integration will be described with respect to FIGS. 2 through 5.

Figure 1:
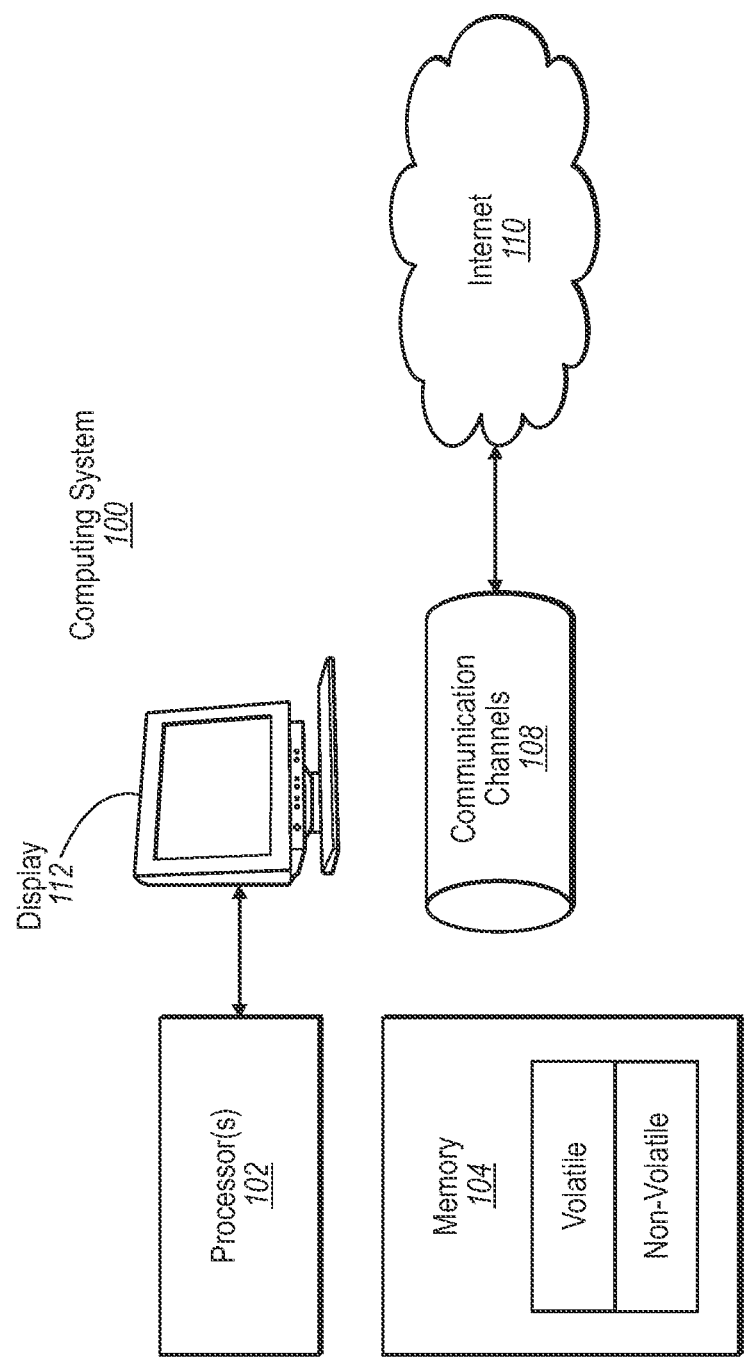
FIG. 1 illustrates computing system in which one or more embodiments described herein may be employed.

FIG. 1 illustrates a computing system 100. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processor 102 and memory 104. The memory 104 may be physical system memory, which may be volatile, non-volatile, or some combination of the two. The term "memor" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Another example of such an operation is the display of information and interfaces on the display 112.

Computing system 100 may also contain communication channels 108 that allow the computing system 100 to communicate with other message processors over, for example, network 110 (such as perhaps the Internet). Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term "computer-readable media" as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter as defined in the appended claims is not necessarily limited to the specific features or acts described herein. Rather, the specific features and acts described herein are disclosed as example forms of implementing the claims.

Figure 2:
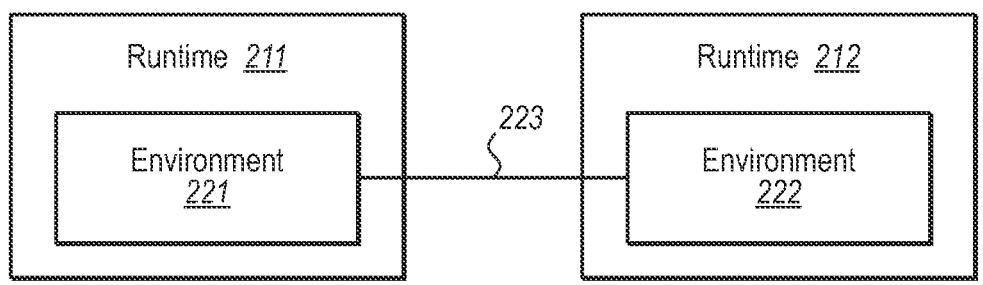
FIG. 2 illustrates a runtime environment the runtimes that have associated runtime environments.

FIG. 2 illustrates a runtime environment 200 that includes a first runtime 211 that operates using a first runtime environment 221, and a second runtime 212 that operates using a second runtime environment 222. There is an association 223 between the runtime environments 221 and 222, which will be discussed in further detail further below in this description. In one embodiment, the runtime environment 200 may be executed by the computing system 100 of FIG. 1.

Figure 3:
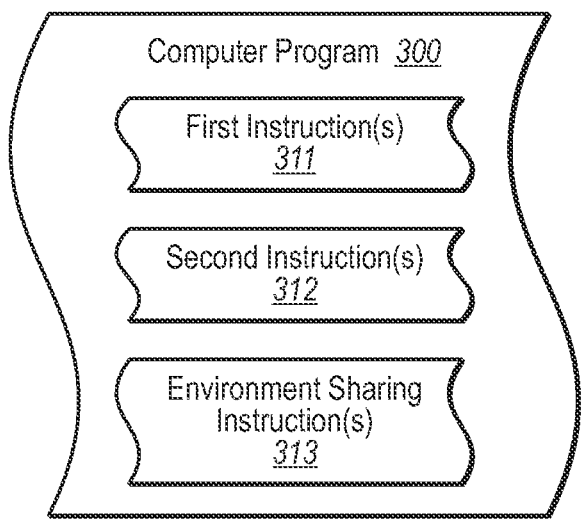
FIG. 3 illustrates a computer program that may be executed using both runtimes of FIG. 2.

FIG. 3 illustrates a computer program 300 that may be executed using the first and second runtimes 211 and 212 of FIG. 2. Specifically, the computer program 300 includes a first set of one or more computer-executable instructions 311 that are to be executed using the first runtime 211, and also includes a second set of one or more computer-executable instructions 312 that are to be executed using the second runtime 212. The computer program 300 also includes one or more environment sharing computer-executable instruction(s) 313 that are structured such that at least a portion of the first and second runtime environments 221 and 222 may be shared so as to be accessible by both runtimes 211 and 212. It is these environment sharing computer-executable instructions 313 in the computer program 300 that create the association 223 between the runtime environments 221 and 222 that allows the runtime environments to be shared between both runtimes 211 and 212.

There is no limit to how the runtime environments may be shared. In one embodiment, the sharing occurs through binding to one or more variable in one environment with one or more variables in another. Alternatively or in addition, the as sharing may occur via scoping rules, or perhaps by having one runtime having a view on the environment of the other runtime such that the runtime treats that other environment as part of its own.

In one embodiment, the first set of instruction(s) 311, the second set of instruction(s) 312 and/or the environment-sharing instruction(s) 313 may be expressed declaratively. For instance, XAML is an XML-based application markup language that allows for the construction of elements of a computer-program, where the XML elements are declaratively specified.

Several examples will now be described in further detail in which perhaps the entire program may be specified declaratively using XAML. In these examples, the two runtimes used are 1) a workflow runtime that uses a workflow environment, and 2) a presentation runtime that uses a data context as an environment. More specifically, in this example, the workflow runtime is WINDOWS® workflow Foundation (WF) and the presentation runtime is WINDOWS® Presentation Foundation (WPF). In all of the examples, line numbering is added for clarity and subsequent reference.

In the first example, WPF data bindings are shown using an expression and a WF workflow within a WPF element.

```
1.   <Window x:Name='theWindow'>
2.     <Grid>
3.       ...
4.       <Label>First Name</Label>
5.       <Label Grid.Row='1'>Last Name</Label>
6.       <Label Grid.Row='2'>Full Name</Label>
7.       <Label Grid.Row='2' Grid.Column='1'>
8.         <Label.Content>
9.           <newWPF:ExpressionBinding>
10.            FirstName.Text + " " + LastName.Text
11.          </newWPF:ExpressionBinding>
12.        </Label.Content>
13.      </Label>
14.      <TextBox x:Name='FirstName' Text='John' Grid.Column='1' />
15.      <TextBox   x:Name='LastName'    Text='Doe' Grid.Row='1' Grid.Column='1' />
16.      <Button      Content='Done    With      This' Grid.Row='3' Grid.ColumnSpan='2'>
17.        <Button.Click>
18.          <newWF:DelegateActivity>
19.            <newWF:MethodCall             Instance= '[theWindow]' Method='Close' />
20.          </newWF:DelegateActivity>
21.        </Button.Click>
22.      </Button>
23.    </Grid>
24. </Window>
```

Lines 1 through 24 represent a WPF window element called "the Window". As specified in line 1, the Windows object includes an x:Name attribute, causing the window object to become available to the data context representing the WPF environment. The data from the data context is used to drive the WPF presentation. When executed by the WPF presentation runtime, the WPF element will render a window.

Lines 2 though 23 represent a WPF grid element within the window, which when executed with a WPF presentation runtime, causes the grid to be rendered within the window. In this case, the WPF grid element includes a Label element specified in line 4 that will label the grid with the text "First Name". There is another Label element specified in line 5 that will label the first row in the grid with the text "Last Name". Another Label element specified in line 6 will label the second row in the grid with the text "Full Name".

Label elements are used frequently in WPF declarative code. The labels in lines 4 through 6 are conventional Label elements. However, the Label element that spans lines 7 through 13 has its content defined in a manner that is not conventional for WPF declarative code. The Label element includes a Label.Content element spanning from lines 8 through 12. Label.Content elements are used in conventional WPF declarative code. However, the manner in which its content is defined is not conventional.

Specifically, an ExpressionBinding element spanning from lines 9 through 11 includes an expression at line 10. This expression at line 10 is bound to FirstName.Text and LastName.Text and will resolve each time any of the bound data changes. The namespace "newWPF" is used to represent that this element is new and not defined by conventional WPF standards. As will be explained further below, the names FirstName.Text and LastName.Text and their associated values are included in the data context for the WPF presentation runtime. Specifically, in this example, the names FirstName.Text and LastName.Text are defined in TextBox elements of lines 14 and 15. The TextBox elements could just as easily been presented prior to the Label element spanning lines 7 through 13. However, in this example, the TextBox elements were placed after to emphasize that objects with x:Name attributes are in the environment, regardless of where the object appears in the declarative code.

The ExpressionBinding element is a new markup extension. The ExpressionBinding element was arbitrarily named "ExpressionBinding". Accordingly, the name of the particular markup extension may change in the future. In WPF, markup extensions have a method "ProvideValue" that is called when the XAML parser parses the markup extension. Accordingly, rather than there being a particular object called "ExpressionBinding", the method ProvideValue is called on that object, with the result of that method call being used to populate the Label.Content property. In this case, the ProvideValue method would resolve the expression at line 10.

A TextBox WPF element is declared at line 14 and is defined as including an x:Name attribute called FirstName with an initial text value of "John" included within it. Also, the TextBox will be rendered in column 1 of the grid. Since the object "FirstName" is defined with an x:Name attribute, the following name-value pair will be initially included in the data context: FirstName.Text=John.

Another TextBox WPF element is declared at line 15 and is defined as including an x:Name attribute called LastName with an initial text value of "Doe" included within it. Also, the TextBox will be rendered in row 1, column 1 of the grid. Since the object "LastName" is also defined with an x:Name attribute, the following name-value pair will be initially included in the data context: LastName.Text=Doe.

Accordingly, through the use of x:Name attributes, the name-value pairs for FirstName.Text and LastName.Text are included in the data context, thereby allowing the expression at line 10 to resolve to thereby generate the label content for the label spanning lines 7-13 of the example XAML code.

Lines 16-22 define a WPF button element, that includes a Button.Click event spanning from lines 17-21. Thus far, the described declarative code could be handled by the WPF presentation runtime, albeit with modification from the convention WPF standard to accommodate the ExpressionBinding markup extension. In addition, Button elements and included events (such as Button.Click events) are known WPF concepts. However, the way in which the Button.Click event is handled in the example is something entirely new to the WPF presentation runtime. Specifically, a WF workflow is used to handle the WPF Button. Click event.

Once again, a new markup extension is employed tentatively named the DelegateActivity extension. As previously mentioned, XAML defines that markup extensions include a standard method (presently called "ProvideValue"). The ProvideValue method of this markup extension returns a delegate that invokes the embedded WF activities. For instance, line 19 defines a simple workflow activity of just a single line. In this case, a simple P/Invoke-like activity tentatively named Method Call calls the Close method on the WPF window named "theWindow". However, line 19 could be replaced by any set of one or more WF activities of arbitrary length and complexity that would be executed when executing the DelegateActivity extension.

Whatever the set of workflow activities are, the workflow activities run in an environment (i.e., the runtime environment of the workflow runtime) that includes the WPF data context (i.e., the runtime environment of the presentation runtime), which recall will include all of those name-value pairs that are defined using an x:Name attribute. Should execution of the activity result in a change in the environment that is bound to the data context, not only will the environment change, but the corresponding values of the data context will change as well, potentially resulting in some change in the presentation. For instance, during the execution of the workflow, if FirstName.Text or LastName.Text should change, the expression at line 10 would be reevaluated causing the content of the label at row 2 and column 1 to change. Thus, referring to FIG. 2, the use of the described DelegateActivity extension provides an example of how the runtime environments 221 and 222 of the runtimes 211 and 212 may be associated together (see association 223).

Furthermore, referring to FIG. 3, the WPF declarative code spanning lines 1 through 18 and 20 through 24 represents an example of the first set of computer-executable instructions 311, which are executed using the WPF presentation runtime. The WF declarative code at line 19 represents an example of the second set of computer-executable instructions 312, which are executed using the WF workflow runtime. Lines 18 and 20, which define the use of a DelegateActivity extension in response to a WPF event (in combination with the use of x:Name attributes in the WPF declarative code) represents an example of the environment sharing computer-executable instructions 313 of FIG. 3.

Although only one event "Button.Click" and one corresponding DelegateActivity extension are described in this example, there may be multiple events. In that case, each event might result in a corresponding workflow activity being executed, wherein each workflow would potentially have an environment that is associated with the data context such that changes to the data context are propagated into the environment, and vice versa.

The DelegateActivity extension is not just a mechanism for sharing runtime environments, but also allows control to be passed from one runtime to another when executing declarative code. More regarding this transfer of control will be described below with respect to FIGS. 4 and 5.

For the sake of completeness, as an alternative, new WPF event handlers may also be specified through WPF Command Bindings, as the next example shows.

```
1.   <Window x:Name='theWindow'>
2.      <Window.CommandBindings>
3.         <CommandBinding          Command=
            '{x:Static ApplicationCommands.Close}'>
4.            <CommandBinding.Executed>
5.               <ozWF:DelegateActivity>
6.                  <ozWF:MethodCall    Instance=
                    '[theWindow]' Method='Close' />
7.               </ozWF:DelegateActivity>
8.            </CommandBinding.Executed>
9.         </CommandBinding>
10.     </Window.CommandBindings>
11.     <Grid>
12.        ...
13.        <Button    Content='Done    With    This'
            Command='{x:Static ApplicationCommands.Close}' ... />
14.     </Grid>
15.  </Window>
```

In the XAML examples above, the XAML is first executed by the WPF runtime, and the WF runtime is executed in a nested fashion at line 6 within the WPF declarative code.

However, the roles may be reversed. That is, in the XAML example that as follows, the XAML is first executed by a WF runtime, and then the WPF runtime executes in a nested fashion within the WF declarative code. That is there is some mechanism specified in the WF declarative code for transferring control to the WPF runtime, and receiving back control from the WPF runtime. The use of the namespace "newWF" is used through representing that this is an example of a new and unconventional form of workflow.

```
1.   <wf:Sequence>
2.      < WF:CompositeActivity.Variables>
3.         < WF:Variable x:TypeArguments='s:String'
              Name='firstName'
              InitialValueExpression='Jon' />
4.         < WF:Variable x:TypeArguments='s:String'
              Name='lastName'
              InitialValueExpression='Do' />
5.      </ WF:CompositeActivity.Variables>
6.      <newWPF:ShowModalWindow>
7.         <Window>
8.            <Grid>
9.               ...
10.              <TextBox Text='{Binding firstName}'
                 Grid.Column='1' />
11.              <TextBox Text='{Binding lastName}' Grid.Row='1'
                 Grid.Column='1' />
12.              <Label Grid.Row='2' Grid.Column='1'>
13.                 <Label.Content>
14.                    <newWPF:ExpressionBinding>
15.                       firstName + " " + lastName
16.                    </newWPF:ExpressionBinding>
17.                 </Label.Content>
18.              </Label>
19.              ...
20.           </Grid>
21.        </Window>
22.     </newWPF:ShowModalWindow>
23.     <newWPF:ShowModalWindow>
24.        <Window>
25.           <Grid>
26.              ...
27.              <Label Grid.Column='1'>
28.                 <Label.Content>
29.                    <newWPF:ExpressionBinding>
30.                       firstName + " " + lastName
31.                    </newWPF:ExpressionBinding>
32.                 </Label.Content>
33.              </Label>
34.              ...
35.           </Grid>
36.        </Window>
37.     </newWPF:ShowModalWindow>
38. </WF:Sequence>
```

In the example above, the WF workflow is a Sequence extending from lines 1 through 38. Lines 2 through 5 define an environment for the workflow activity. Although the workflow activity may inherit environment from a parent activity through scoping rules, for this example, it is only the environment defined by lines 2 through 5 that is relevant. For instance, in line 3, a string environmental variable called "firstName" is initially assigned a value "Jon". Likewise, in line 4, a string environmental variable called "lastName" is initially assigned a value "Do".

In a sequence activity such as that spanning from lines 1-38, the child activities are executed in the order that they appear in the sequence. In this example, there are two child activities, a first ShowModalWindow activity extending from line 6 to line 22, and a second ShowModalWindow activity extending from line 23 to line 37. Since they are child activities within a sequence activity, the first ShowModalWindow activity will execute first, and the second ShowModalWindow activity will execute second once the first ShowModalWindow activity is completed. The behavior of the ShowModalWindow activity is to display the window that is its child activity, and not to complete the activity until that window is closed. Thus, the ShowModalWindow activity spanning lines 6 through 22 will only complete once the window that it displays (spanning from lines 7 though 21) is closed. Only then will the next ShowModalWindow activity spanning lines 23 through 37 be executed. That second ShowModalWindow activity will display the window defined by lines 24 through 36, and will complete only when that window is closed. Although not shown, the ShowModalWindow activities may use templates to prevent both windows from being displayed immediately once parsed by the XAML parser.

The windows are actually WPF elements. Accordingly, transfer of control from the WF runtime to the WPF runtime is represented by a particular kind of child as activity (in this case, a window element) appearing. This causes the environment of the workflow to be viewable by the window WPF element as part of the data context of the WPF window element.

The window spanning from lines 7 through 21 will result in a grid defined by lines 8 through 20 being displayed within the window. Line 10 represents a TextBox WPF element that is displayed at column 1 of the grid. In this case, "Text='{Binding firstName}'" means that the text property of the TextBox (i.e., the text that is displayed in the TextBox) is to always be equal to the data context variable called firstName. Line 11 represents another TextBox WPF element that is displayed at row 1 and column 1 of the grid. The "Text='Binding lastName'" means that the text property of that TextBox is to always be equal to the data context variable called lastName. Lines 12 through 18 represents a label that is to be displayed at row 2 and column 1 of the grid and that contains content that is the result of the expression represented at line 15.

To fully understand the interconnection between the WF environment and the data context of the WPF element, let us consider a scenario. Consider that the user has changed the text value in the first TextBox that is bound to the data context variable firstName. For instance, perhaps the user discovered that the firstName should be "John" and not "Jon". Thus, the user clicks on the TextBox, and retypes the firstName as "John". The user's actions will most immediately cause the value of the Text property of the TextBox to be changed to the string "John". Since this Text property is bound to the data context variable firstName, the firstName data context value will change to "John" as well. Now, there are two effects that happen. For one, since the window element has a data context that is a view on the workflow environment, the workflow environment variable "firstName" also changes. In as addition, the expression at line 15 is reevaluated resulting in different content for the Label element defined by lines 12 through 18. The user might interface with the TextBox elements changing the Text property values any number of times (zero or more or perhaps thousands of times), each time resulting in a new expression resolution, and different content for the label.

Regardless, once the window closes, control is returned from the WPF presentation runtime back to the WF workflow runtime. In addition, the first ShowModalWindow activity closes, and the second ShowModalWindow activity begins. With the encountering once again of a window element (spanning lines 24-36), control once again passes to the WPF presentation runtime, and the data context for that WPF window element has a view on the environment of the parent workflow. Specifically, the data context of the second WPF window element continues to have data context variables firstName and lastName, having the value that they had when the first ShowModalWindow activity was closed.

The second WPF window element also includes a grid (defined by lines 25 through 35) that includes a single label defined by lines 27 through 33. Here, the label content is once again defined by an expression that is evaluated with the values inherited from the workflow environment. In particular, if the user changed the values in the first WPF window to read "John" and "Doe", instead of "Jon" and "Do", the second WPF window would display the result of this editing.

In this last XAML example, lines 1 through 6, 22, 23, 37 and 38 are examples of the first set of instructions 311 of FIG. 3 that are executed under the control of a first runtime (in this case, a WF runtime). On the other hand, lines 8 through 20, and 25 through 35 are examples of the second set of instructions 312 of FIG. 3 that are executed under the control of the second runtime (in this case, a WPF runtime). Lines 7, 21, 24 and 36 are examples of the environment sharing computer-executable instructions 313 of FIG. 3 in which the environments of the WF and WPF runtimes are associated together.

Figure 4:
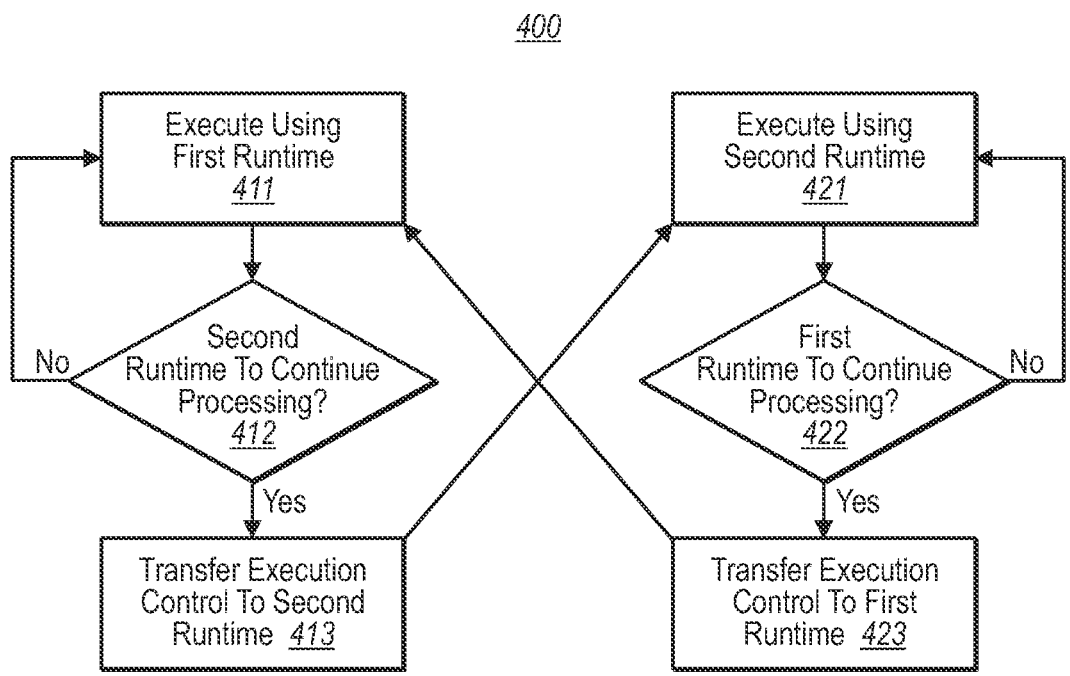
FIG. 4 illustrates a flowchart of a method for transferring control between runtimes.

FIG. 4 illustrates a flowchart of a method 400 for coordinating execution of multiple runtimes. In the above examples, one example has been presented in which the WPF presentation runtime first runs, and then passes control to the WF runtime, after which control passes back to the WPF runtime. Another example has been presented in which the WF runtime begins execution, but then passes control to the WPF runtime to display windows. However, the principles of the present invention are not limited to these specific examples or runtimes. FIG. 4 illustrates the process of transferring control more generally.

The discussion of FIG. 4 will begin with the execution of a portion of a computer program using a first runtime for a first portion of time (act 411). The first runtime continues execution (act 411) as long has there has not been a determination that a second runtime is to continue processing (No in decision block 412). At some point, it is determined that a second runtime is to continue execution (Yes in decision block 412). In response, control is transferred to the second runtime to execute the computer program (act 413). The second runtime continues execution (act 421) so long as it is not determined that the first runtime is to again resume execution (No in decision block 422). If it is determined that the first runtime is to resume execution (Yes in decision block 422), the execution control is passed again to the first runtime (act 423), whereupon the first runtime continues execution (act 411). This process continues until execution of the program is completed.

Figure 5:
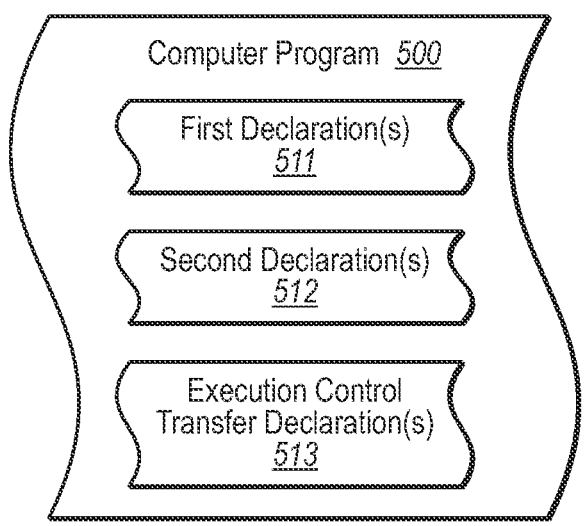
FIG. 5 illustrates a declarative computer program in which declarations transfer control from one runtime to the other.

FIG. 5 illustrates a data structure of a computer program 500 that declaratively defines a computer program that is to be executed using multiple as runtimes. While the XAML examples above represent several examples of how this might be accomplished, these examples are by no means limiting of the broader principles described herein. FIG. 5 shows a data structure more generally.

The computer program 500 includes one or more declarations 511 that are executable with the assistance of a first runtime (e.g., a presentation runtime), one or more declarations 512 that are executable with the assistance of a second runtime (e.g., a workflow runtime), and one or more declarations 513 that cause execution control to be passed between the presentation runtime and the workflow runtime.

The use of the term "first" and "second" as used herein is not intended to imply any soft of chronological or positional ordering unless otherwise noted. For instance, the first declarations 511 need not occur or be executed before the second declarations 512. In fact, the declarations 511 directed towards the first runtime, and the declarations 512 directed towards the second runtime may be interspersed, with perhaps appropriate control transfer declarations 513 occurring therebetween at the transition points.

In the XAML examples above, one XAML example showed how WF declarations could be nested within WPF declarations. Another showed how WPF declarations could be nested within WF declarations. However, in another more complex embodiment, there could be multiple nested layers. For instance, WF declarations could be nested within WPF declarations which could be nested in yet other WF declarations. Likewise, WPF declarations could be nested within WF declarations which could be nested in yet other WPF declarations. This could continue for any number of nested levels.

Accordingly, the principles described herein present mechanisms for declaratively integrating different runtimes by associating their environments together, and by declaratively transferring control between runtimes at the appropriate times. Thus, the strengths of the runtimes may be taken advantage of when needed by the computer program, rather than having the computer program rely on a single runtime for execution. Thus, for example, WPF presentation logic could be integrated with WF control logic in a computer program allowing the program to use WPF when needed for presentation, and using WF when needed for underlying control.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more physical storage media having thereon computer-executable instructions which, when executed, cause a computing system to implement a method of integrating a workflow runtime of a workflow environment and a presentation runtime of a presentation environment, the computer-executable instructions defining a data structure comprising:
   a runtime schema which comprises at least one or more portions having integrated runtime instructions within the same schema, the integrated runtime instructions comprising,
      one or more first computer-executable instructions for a first runtime that operates using a first runtime environment when executing an application, the one or more first computer-executable instructions being configured to establish one or more environment variables within the first runtime environment;
      one or more second computer-executable instructions for a second runtime that operates using a second runtime environment when executing said application, the one or more second computer-executable instructions being configured to operate within the first runtime environment, including being configured to use at least one of the one or more environment variables of the first runtime environment; and
      one or more third computer-executable instructions that provide for execution of the second computer-executable instructions within a view of the first runtime environment, so that the executing application shares access to both runtime environments through said same schema, the one or more third computer-executable instructions using one or more bindings,
   wherein the first runtime is a workflow runtime and the first runtime environment is a workflow environment and wherein the second runtime is a presentation runtime and the second runtime environment is a data context for the presentation runtime.

2. The computer program product in accordance with claim 1, wherein the integrated runtime instructions of said schema are expressed declaratively.

3. The computer program product in accordance with claim 1, wherein the one or more third computer-executable instructions that provide for execution of the second runtime instructions within a view of the first runtime instructions use scoping rules.

4. A computer program product comprising one or more physical storage media having thereon computer-executable instructions which, when executed, cause a computing system to implement a method of integrating a workflow runtime of a workflow environment and a presentation runtime of a presentation environment, the computer-implemented method comprising acts of:
   instantiating at a computing system a runtime schema which comprises at least one or more portions having integrated runtime instructions within the same schema, the integrated runtime instructions comprising,
      one or more first computer-executable instructions for a first runtime that operates using a first runtime environment when executing an application, the one or more first computer-executable instructions being configured to establish one or more environment variables within the first runtime environment;
      one or more second computer-executable instructions for a second runtime that operates using a second runtime environment when executing said application, the one or more second computer-executable instructions being configured to operate within the first runtime environment, including being configured to use at least one of the one or more environment variables of the first runtime environment; and
      one or more third computer-executable instructions that provide for execution of the second computer-executable instructions within a view of the first runtime environment, so that the executing application shares access to both runtime environments through said same schema, the one or more third computer-executable instructions using one or more bindings; and
   during execution of said application,
      executing the instructions of said schema for the first runtime;
      executing the instructions of said schema that provide for execution of the second runtime instructions while within the view of the first runtime instructions; and
      executing the instructions of said schema that provide for execution of the second runtime instructions,
      wherein the first runtime is a presentation runtime and the first runtime environment is a data context for the presentation runtime and wherein the second runtime is a workflow runtime and the second runtime environment is a workflow environment.

5. The computer program product in accordance with claim 4, wherein the integrated runtime instructions of said schema are expressed declaratively.

6. The computer program product in accordance with claim 4, wherein after executing the instructions of said schema that provide for execution of the second runtime instructions, control is transferred to said second runtime which then executes the second runtime instructions, following which control is transferred back to the first runtime.

7. The computer program product in accordance with claim 6, wherein control of execution between the first and second runtimes is transferred back and forth multiple times within said schema.

8. A computer system comprising:
   one or more physical storage media having thereon computer-executable instructions which, when executed, cause a processor of the computing system to implement a method of integrating a workflow runtime of a workflow environment and a presentation runtime of a presentation environment, the computer-executable instructions defining a data structure comprising:
   a runtime schema which comprises at least one or more portions having integrated runtime instructions within the same schema, the integrated runtime instructions comprising,
      one or more first computer-executable instructions for a first runtime that operates using a first runtime environment when executing an application, the one or more first computer-executable instructions being configured to establish one or more environment variables within the first runtime environment;
      one or more second computer-executable instructions for a second runtime that operates using a second runtime environment when executing said application, the one or more second computer-executable instructions being configured to operate within the first runtime environment, including being configured to use at least one of the one or more environment variables of the first runtime environment; and
      one or more third computer-executable instructions that provide for execution of the second computer-executable instructions within a view of the first runtime environment, so that the executing application shares access to both runtime environments through said same schema, the one or more third computer-executable instructions using one or more bindings; and a processor which executes an application, and during said execution the processor executing the instructions of said schema for the first runtime;

executing the instructions of said schema that provide for execution of the second runtime instructions while within the view of the first runtime instructions; and executing the instructions of said schema that provide for execution of the second runtime instructions, wherein the first runtime is a presentation runtime and the first runtime environment is a data context for the presentation runtime and wherein the second runtime is a workflow runtime and the second runtime environment is a workflow environment.

* * * * *